Aug. 20, 1963 J. H. ANDRESEN, JR 3,100,999
RAPID RESPONSE PRESSURE INSTRUMENT
Filed May 22, 1959
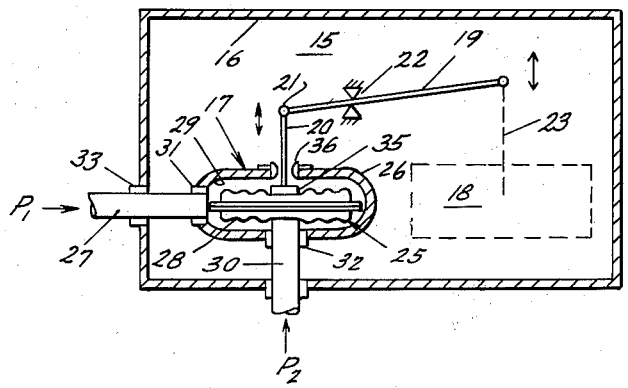
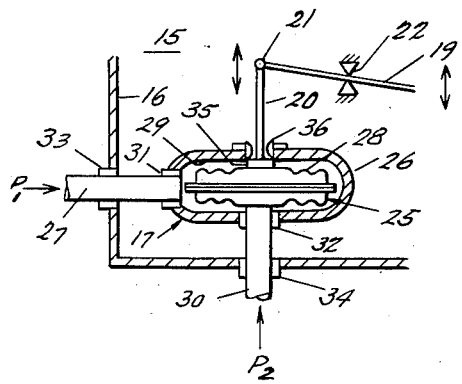
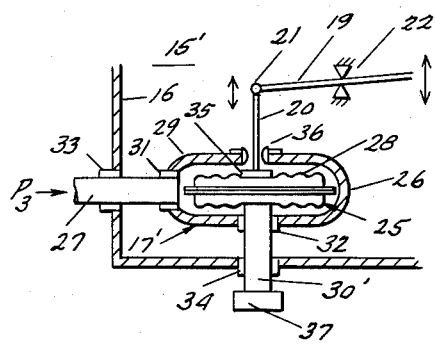
INVENTOR.
JOHN H. ANDRESEN, JR.
BY
ATTORNEYS

United States Patent Office 3,100,999
Patented Aug. 20, 1963

---

3,100,999
RAPID RESPONSE PRESSURE INSTRUMENT
John H. Andresen, Jr., Greenwood Lake, N.Y., assignor to Kollsman Instrument Corporation, Elmhurst, N.Y., a corporation of New York
Filed May 22, 1959, Ser. No. 815,224
12 Claims. (Cl. 73—407)

This invention relates to pressure instrument, and more particularly relates to novel pressure instruments that are rapidly responsive to air or gas pressure changes.

In an endeavor to make a pressure instrument respond rapidly to pressure change, and thereby operate a pointer position or an electrical transducer with a minimum time lag, several expedients were used heretofore. The limiting factor is the lag caused by the time it takes for the gas whose pressure is being measured to fill the instrument to such pressure. Such lag may be reduced by the use of sufficiently large diameter for the tubing and restricting orifices from the pressure source as practicable, and as small a volume for the instrument as is feasible. In the past, where a servo follow-up was required, the instrument case containing the diaphragm or bellows plus associated linkage was made relatively small. This was then coupled to associated equipment and the servomotor through a friction producing, fairly leak-tight, seal in the case containing the bellows mechanism. Alternatively, in the past an absolute pressure to be measured was led inside a diaphragm capsule or bellows, and the other components of the mechanism plus any servo components were enclosed in an hermetically sealed, evacuated case.

In accordance with the present invention, a case is used closely approximating the outside shape of the capsule. One the moveable side of the capsule is a small diameter push rod which fits loosely through an orifice in the case. The electrical pick-off or transducer mechanism is fitted in an ample sized housing together with the encased capsule and this enclosure is then made leak-tight by gasketing or similar means. The push rod is unhindered in its translation of the axial displacement of the bellows within the case to the transducer within the housing. The small leak of gas from within the capsule case through the orifice, about the push rod, causes the pressure within the container to slowly equalize with that in the case.

An important advantage of my present invention is that the frictional resolution of the instrument is unimpaired. This is because no friction producing seal is used. Also, no true hermetic sealing of the housing is required. Due to the very small net volume of the capsule case, the capsule and push rod respond immediately and in substantially full measure to an applied pressure change. Further, with the pressure supply tubing of large diameter compared with the leak around the push rod through the orifice, there is negligible effective pressure drop in the tubing during the pressure equalizing process in the housing. This invention applied to both absolute and differential pressure measuring instruments, and the like.

It is accordingly a primary object of the present invention to provide a novel pressure instrument that is rapidly responsive to applied pressure changes.

Another object of the present invention is to provide a novel pressure instrument having an orifice and push rod, with a permissible small leakage about the push rod from an encased capsule into the container for the other instrument components.

Still another object of the present invention is to provide a novel pressure instrument with rapid response and excellent resolution of indication or pressure translation.

A further object of the present invention is to provide a pressure instrument capable of substantial size to contain servomechanism and associated equipment, without limiting accuracy or rapid response of the instrument action.

Still a further object of the present invention is to provide a pressure instrument that is rapidly responsive to pressure change, having a large container with associated servomechanism that requires no hermetic sealing.

These and further objects of the present invention will become more apparent from the following description of an exemplary embodiment thereof, taken in connection with the drawings in which:

FIGURE 1 is a diagrammatic showing of an exemplary pressure instrument.

FIGURE 2 illustrates the extended position of the diaphragm capsule in its case.

FIGURE 3 illustrates an alternate form of the instrument, used for absolute pressure operation.

FIGURE 1 diagrammatically illustrates one form of the invention instrument. The pressure device 15 is enclosed in container 16 of sufficient size to house the pressure gaging unit 17 and conventional mechanism or servomechanism associated therewith, schematically indicated at 18. A lever 19 is shown linked to the push rod 20 extending from pressure unit 17, at joint 21. Lever 19 is pivoted as at 22 and transmits axial motion imparted to rod 20 by unit 17 to servomechanism 18 through linkage 23. Other equivalent coupling or electrical pick-off means may be used to translate pressure displacements of rod 20 into mechanical or electrical counterparts to the associated servomechanism 18, to an indicator, or to other equipment contained in housing 16, as will be understood by those skilled in the art.

The sensing diaphragm capsule or bellows 25 is enclosed in a case 26. The interior volume of case 26 is shaped and proportioned to closely approximate the exterior volume of the bellows 25 when in its fully rated expanded condition. In this way minimum gas volume change is required within case 26 for gas at $P_1$ from tube 27 to communicate its pressure conditions to diaphragm capsule 25. Such minimum gas volume in the interior 28 of case 26, coupled with as large a diameter of tubing 27 as is feasible to use in the system, reduces any lag in pressure build up in unit 17 corresponding to changes in pressure $P_1$ to a negligible factor. FIGURE 2, illustrates capsule 25 at its maximum extended condition, with the net case interior 28 at its minimum volume. Case 26 is desirably constructed to generally conform its interior surface 29 with the extended envelope of capsule 25, as indicated in FIGURE 2 for minimum interior gas volume 28. Also, in practice, case 26 is preferably made of rigid material.

The unit 17 is a differential pressure instrument, responding to the difference in pressures $P_1$ and $P_2$ applied thereto. Pressure $P_1$ is applied to the interior 28 of case 26 through tube 27 coupled at 31 thereto. Pressure $P_2$ is introduced to the interior of a conventional diaphragm capsule 25 or through tube 30 coupled through case 26 at rim 32. Tubes 27 and 30 are of as large diameter as practicable, as hereinabove stated. In the exemplary instrument 15, a diameter of 1/8" is used for tubes 27 and 30 for a diaphragm bellows 25 of two inches in diameter. Tubes 27 and 30 are affixed to housing 16, and sealed at rings 33, 34.

Push rod 20 is attached to the center 35 of the free end of diaphragm capsule 25. Push rod 20 is of small diameter, e.g. .030", and projects in the direction of motion of capsule 25. Rod 20 fits loosely in orifice 36 established in case 26. Case 26 is preferably of rigid material, as aforesaid. Case 26 is sealed along all joints and junctures thereof, whereby the only gas or air passage occurs through tube 27 from $P_1$ and through orifice 36 about rod 20. A diameter of .040" was used in the exemplary orifice 36. This provided a leak area ratio through orifice 36 about rod 20 to the area across tube 27 of about 1/220. The movements of push rod 20 in orifice 36 are substantially unrestricted, as without friction, and accurately transmit displacements of diaphragm capsule 25 to the exterior of rigid case 26.

The area of the leak at the push rod 20 is preferably small, as one-twentieth to one-thousandth of that of the tube 27 leading to the interior of case 26. Then, if a rapid change in supply pressure $P_1$ should occur, it would very quickly fill the space around the diaphragm to this pressure, but would take much longer to fill the case 16 to the changed pressure.

In principle there would be some benefit in response time even if flow resistance of the orifice leak were of the same magnitude as that of supply tube 27. However, as the leak at the orifice 36 about rod 20 is reduced, the lag decreases asymptotically to its lowest value. This is for example accomplished by a .030″ rod 20 in a .040″ orifice 36 with a ⅛″ supply tube 27. It is not necessary to control the orifice leak area closely, so long as it is less than say one-one hundredth of the supply tube 27 area. Nevertheless, while such proportions are practical and desirable ones, it is to be understood that my invention is not limited to such ratios, but rather to the broader principles described and illustrated herein. Also, the specific shape of the orifice 36 surface about push rod 20 is not critical. It is desirable that the leak configuration between rod 20 and orifice 36 establish nonturbulent air or gaseous flow between case interior 28 and the container 16 interior.

The differential pressure responsive unit 17 measures, through displacement of push rod 20, the difference in pressure between that applied to diaphragm capsule 25 through source $P_2$, and that of the case interior 28 through source $P_1$. This can be readily converted into an absolute pressure measuring unit by substituting a vacuum for source $P_2$. The bellows component 25 is evacuated for this purpose, as illustrated in instrument 15′ of FIGURE 3. Towards this end, modified pressure unit 17′ has the interior of bellows 25, together with the stub 30′, evacuated, and capped at 37 to maintain the vacuum. The source pressure $P_3$ is applied to the case interior 28 (as heretofore for pressure $P_1$), with push rod 20 however being responsive to absolute pressure conditions of source $P_3$. The gas flow through orifice 36, about loosely fitting rod 20, functions as described hereinabove.

The container 16 housing pressure unit 17, servomechanism 18, linkage 19, 23 and other desirable associated components, may be of any convenient volume and shape. The performance of the instruments 15, 15′ hereof is in no way impaired by size increase of container 16. The exemplary container 16, as used to house an instrument 15′ designed for use as an absolute pressure transducer, as in FIGURE 3, had these dimensions: 4″ diameter x 5″ long. Other dimensions are of course equally feasible. The sealing at entry and exit points of case 16, e.g. at 33 and 34, has been found satisfactory with the use of usual rubber gaskets, or the like.

A significant feature of my present invention is the relatively small built-in predetermined leak area established between the capsule 25 case 26 and the housing or instrument container 16. In practice, this leak area between push rod 20 and orifice 36 is one-twentieth to one-thousandth of that of the tube 27 that communicates source pressure $P_1$ to the case 16 interior about capsule 25. A larger or smaller percentage for the leak area is feasible, with the important condition that the push rod 20 remain friction free in its displacements within the orifice 36.

Thus, with the said relatively small leak area (out of case 26) as compared to the input tube 27 cross-sectional area, there is little pressure drop in tube 27. The cavity 28 within case 26 is made minimum in volume, and it is filled up rapidly to the source $P_1$ pressure. The pressure existing in container 16 has nothing to do with the measurements translated. The accuracy of the measurements and response are not impaired by a small continuous flow or leak through the leak area between rod 20 and orifice 36, until the pressure within container 16 equalizes with that of source $P_1$. There is a negligible error factor due to fluid frictional pressure drop through line 27 to the pressure source $P_1$.

Further, there is no practicable error derived from orifice pressure on the rod 20 due to its diameter, as the push rod 20 cross-sectional area is made very small (e.g. .030″ diameter) as compared with that of the capsule area (e.g. 2″ diameter). While the interior orifice 36 surface may be of smooth aerodynamic configuration, as aforesaid, it may also, if desired, be a simple aperture of proper diameter as set forth. Typical pressure ranges for the exemplary instruments are: 0 to 150″ Hg for both the absolute (FIGURE 3, for $P_3$), and the differential type (FIGURES 1, 2 for $P_2-P_1$). Other ranges are contemplated.

Although the present invention has been described in connection with the exemplary forms, it is to be understood that many variations and modifications thereof may be made within the broader spirit and scope of the invention as defined in the following claims.

I claim:

1. A pressure instrument of the character described for pressure measurement in excess of that surrounding said instrument, comprising an instrument housing, a diaphragm capsule means, a case surrounding said capsule means, a tube arranged to apply a gas pressure source to the case interior, a member extending from said capsule means through an aperture in said case to transmit displacements of said capsule means in response to pressure variations of said source, means exterior of said case coupled to said member for translating its displacements, and orifice means at said case aperture about said member permitting ready motion of the member through said case; said case, capsule, member and translating means being contained within said instrument housing; said instrument housing being pneumatically connected to the interior of said case through said orifice means; the volume of said case being substantially smaller than the volume of said instrument housing, said instrument housing being sufficiently sealed to serve as a reservoir for gas from said source under static conditions.

2. A pressure instrument as claimed in claim 1, in which the net gas leak area through said orifice means about said member is substantially less than the cross-sectional area of said tube.

3. A pressure instrument of the character described for pressure measurement in excess of that surrounding said instrument, comprising an instrument housing, a capsule means, a case surrounding said capsule means, a tube arranged to apply a gas pressure source to the case interior, a push rod through an aperture in said case to transmit axial displacements of said capsule means in response to pressure changes applied in the case by said source, transducer means coupled to said push rod externally of said case for translating its displacements, and an orifice at said case aperture about said push rod proportioned to permit the displacements of said push rod therethrough with negligible friction; said case, capsule, push rod and transducer means being contained within said instrument housing; said instrument housing being pneumatically connected to said case through said orifice means; the volume of said case being substantially smaller than the volume of said instrument housing, said instrument housing being sufficiently sealed to serve as a reservoir for gas from said source under static conditions.

4. A pressure instrument as claimed in claim 3, in which the net area of said case aperture through which gas can leak about said push rod is less than one-twentieth of the cross-sectional area of said tube.

5. A pressure instrument as claimed in claim 3, in which the cross-sectional area of said push rod is substantially smaller than that of said capsule means.

6. A pressure instrument of the character described for pressure measurement in excess of that surrounding said instrument, comprising diaphragm bellows, a case surrounding said diaphragm bellows with an interior volume closely approximating the outside volume of said diaphragm bellows when it is in its expanded condition to provide a cavity rapidly responsive to gas pressure changes, a tube arranged to apply a pressure source to the case interior, a member extending from said diaphragm bellows through an aperture in said case to transmit displacements of said diaphragm bellows in response to pressure variations of said source, transducer means coupled to said member externally of said case for translating its displacements to associated mechanism, a container housing said case and said mechanism, and means at the case aperture about said member proportioned to permit the member displacements with negligible friction and control the flow rate of gas between the case cavity past said member and said container and thereby effect rapid and accurate translation of the pressure source changes to said mechanism, said container being sufficiently sealed to serve as a reservoir for gas in said case under static conditions.

7. A pressure instrument as claimed in claim 6, in which the net area of said case aperture through which gas can leak about said member is of the order of one-two hundredth of the cross-sectional area of said tube.

8. A pressure instrument as claimed in claim 6, in which the net area of said case aperture through which gas can leak about said member is substantially less than the cross-sectional area of said tube whereby the container gradually establishes the case cavity pressure with negligible pressure drop in the tube.

9. A pressure instrument of the character described for pressure measurement in excess of that surrounding said instrument, comprising capsule means in the form of a bellows with a first tube communicating the bellows interior to a first gas pressure source, a case closely surrounding said capsule means, a second tube arranged to apply a second gas pressure source to the case interior, a push rod extending from said bellows through an aperture in said case to transmit axial displacements of said capsule means in response to pressure differentials between said sources, transducer means coupled to said member externally of said case for translating its displacements, a container housing said case and being substantially sealed from the ambient environment and transducer means with an internal volume substantially larger than the net volume within said case, said aperture comprising a flow restricting orifice about said push rod to minimize the flow leak of gas between the case interior past said push rod and said container and thereby effect rapid and accurate translation of pressure source changes, with the case interior pressure being established gradually in said container through said orifice.

10. A pressure instrument as claimed in claim 9, in which the net gas leak area through said orifice means about said push rod is substantially less than the cross-sectional area of said second tube.

11. A pressure instrument as claimed in claim 10, in which the container is sealed at the entry of said tubes therein with rubber gaskets.

12. A pressure instrument as claimed in claim 9, in which the cross-sectional area of said push rod is substantially smaller than that of said capsule means.

References Cited in the file of this patent
UNITED STATES PATENTS

| | | |
|---|---|---|
| 668,514 | Garrels et al. | Feb. 19, 1901 |
| 1,006,100 | Kent et al. | Oct. 17, 1911 |
| 1,283,085 | Cole | Oct. 29, 1918 |
| 2,079,069 | Johnson | May 4, 1937 |